Patented Nov. 26, 1935

2,022,614

UNITED STATES PATENT OFFICE 2,022,614

STABLE HALOGEN DERIVATIVES OF CAOUTCHOUC AND A PROCESS OF PREPARING SAME

Gerhard Balle and Franz Grom, Frankfort-on-the-Main-Hochst, Germany, assignors to I. G. Farbenindustrie Aktiengesellschaft, Frankfort-on-the-Main, Germany No Drawing. Application March 23, 1933, Serial No. 662,384. In Germany March 25, 1931

12 Claims. (Cl. 260—1)

This invention relates to new stable halogen derivatives of caoutchouc and to a process of preparing same.

The hitherto known halogen derivatives of caoutchouc obtainable by reacting with chlorine or bromine upon caoutchouc are rather unstable in so far as they split off hydrohalic acid when exposed to an elevated temperature.

The said products of the halogenation of caoutchouc contain, when in the crude state, some free halogen and some hydrohalic acid, but besides the said adsorbed constituents the products contain some halogen chemically but loosely bound to the caoutchouc which loosely bound halogen apparently leads to the instability of the halogenated products, viz. to the splitting off of hydrohalic acid, even after the absorbed hydrohalic acid and halogen are completely removed.

Now we have found that sufficiently stable halogen derivatives of caoutchouc can be obtained by reacting with basic substances upon the known reaction products of chlorine or bromine upon caoutchouc. This invention is based upon the discovery that the chlorine or bromine entering the caoutchouc molecule in the course of the halogenation reaction, can partly be removed by the action of basic substances, whereas the other part of the chlorine or bromine remains unattacked, thus yielding a halogenated caoutchouc which is stable up to temperatures of about 180° C. to about 200° C.

The temperature conditions at which the more loosely chemically bound halogen can be removed from the halogenated caoutchouc are as follows: When applying alkali metal oxides or hydroxides, such as potassium- or sodium hydroxide, any desired temperature may be applied up to about 150° C. Preferred temperature ranges in this case are those between about 0° C. and about 40° C. On the other hand, when applying basic substances which are less basic than caustic alkalies the application of a temperature between about 40° C. and about 150° C. is necessary to obtain good results, and it is to be pointed out that at normal or lower temperatures the treatment of halogenated caoutchoucs with basic substances other than the oxides and hydroxides of the alkali metals does not yield stable products, since in this case the more loosely chemically bound halogen of the halogenated caoutchoucs is not removed.

As basic substances which are less basic than caustic alkalies there may be used any desired other organic or inorganic basically reacting substances, such as sodium- or potassium-carbonates, -bicarbonates, -phosphates, -borates, calcium oxide, calcium hydroxide, calcium carbonate, calcium acetate, calcium borate or other earth alkali metal oxides, -hydroxides or -salts, ammonium hydroxide, tertiary aliphatic or aromatic amines, such as dimethylaniline, pyridine, furthermore other aliphatic or aromatic amines, such as butylamine, diethylamine, piperidine, etc.

The reaction is preferably performed in a solvent capable of dissolving the halogenated caoutchouc provided that the solvent is resistant to the basic substances.

The working up of the reaction mixtures obtainable as disclosed above may be performed in the most various manners. For example, a solution of a chlorinated caoutchouc may be allowed to stand for some time until the salts having formed by the interaction of the hydrohalic acid or the halogen with the basic substance have precipitated, whereafter the solution is drawn off and the halogenated caoutchouc isolated by distilling off the solvent or by removing it by means of a drum drier. Obviously, the isolation of the halogenated caoutchouc may also be performed by filtering the reaction mixture, for example, through a finely meshed copper sieve or a stone ware suction filter and then removing the solvent as disclosed above.

A further method of isolating the halogenated caoutchouc is by evaporating the reaction mixture to dryness and extracting the residue with hot or cold water. The methods of working up the reaction mixtures as disclosed above are especially valuable in case inorganic basic substances have been applied in the stabilizing reaction.

As to the properties of the halogenated caoutchoucs obtained as disclosed above, they are substantially more stable than the halogenated caoutchoucs known up to date. For example, they may generally be heated up to 180°–200° C. for not too long a time without splitting off hydrohalic acid. The stabilized halogenated caoutchoucs which have been obtained under rather mild conditions (low temperatures or weak basic substances) are generally more soluble in organic solvents than those obtained with the application of stronger conditions of working. The former products therefore, are especially suitable for lacquer purposes, whereas the latter products are valuable media for the preparation of formed plastic articles.

The following examples serve to illustrate the invention, but they are not intended to limit it thereto, the parts being by weight:

*Example 1.*—100 parts of caoutchouc tetrachloride, obtainable by reacting with chlorine upon a solution of caoutchouc in carbon tetrachloride and subsequently blowing air into the solution to remove the excess of chlorine, are boiled for about one hour in the original carbon tetrachloride solution with the addition of about 10 parts of a methylalcoholic potassium hydroxide of about 25 per cent. strength. By adding an excess of alcohol to the solution there is obtained a halogenated caoutchouc with a slightly diminished halogen content, but being stable up to about 180° C.

*Example 2.*—100 parts of chlorinated caoutchouc, dissolved in carbon tetrachloride, are heated with 10 parts of a 20 per cent. solution of potassium hydroxide to about 60° C. in an autoclave for about 3 hours. The reaction product is isolated as described in Example 1. It is stable up to about 190° C.

*Example 3.*—A solution of 50 parts of chlorinated caoutchouc in 165 parts of carbon tetrachloride is boiled for about 8 hours, while refluxing, and with the addition of 5 parts of calcined sodium carbonate. The chlorinated caoutchouc thus obtained is distinguished by an excellent stability without showing a decrease of viscosity.

*Example 4.*—100 parts of chlorinated caoutchouc, dissolved in solvent naphtha, are reacted upon with 5 parts of pyridine while heating for about 3 hours. After the reaction is complete the pyridine and solvent naphtha are removed by blowing steam into the reaction mixture. The chlorinated caoutchouc thus obtained is very resistant to elevated temperatures.

*Example 5.*—100 parts of chlorinated caoutchouc are heated for about 2 hours with about 500 parts of a one per cent. calcium hydroxide solution while adding water to the mixture in the same degree as the water evaporates in the course of the reaction. The mixture is slightly acidified and the residue is washed and dried. The chlorinated caoutchouc thus obtained is stable up to about 160° C.

*Example 6.*—110 parts of brominated caoutchouc, dissolved in carbon tetrachloride, are boiled for about one hour with the addition of about 10 parts of methylalcoholic potassium hydroxide of about 25 per cent. strength. The reaction product is isolated by adding alcohol to the solution.

*Example 7.*—100 parts of caoutchouc are dissolved in 1900 parts of chloroform with the addition of 1 part of copper oleate while heating in a reflux condenser and simultaneously passing through air until a thin viscous solution is obtained. The solution is then chlorinated with 280 parts of chlorine at room temperature. The solution is heated to boiling while simultaneously distilling off one part of the chloroform. The solution thus obtained being free from hydrochloric acid is treated with 27 parts of potassium carbonate and heated to 40°–50° C. for 15 hours. The chlorinated caoutchouc thus obtained is distinguished by a good stability without showing a decrease of viscosity.

*Example 8.*—100 parts of crepe are heated to boiling in 1900 parts of carbon tetrachloride for 2 hours. The solution is then treated with 0.6 parts of $NO_2$ dissolved in 90 parts of carbon tetrachloride. The thin viscous caoutchouc solution thus obtained is treated with the the three-fold quantity of chlorine. After distilling off the dissolved free hydrochloric acid the solution is treated with 11 parts of calcined sodium carbonate and heated to boiling for 8 hours in a reflux condenser while stirring. The chlorinated caoutchouc, isolated from this solution, shows only a slight increase of viscosity compared with a non-stabilized test, and is distinguished by a good stability.

*Example 9.*—50 parts of crepe are dissolved in 950 parts of methylene chloride with the addition of 0.5 parts of benzoyl superoxide and chlorinated with the 2.8 to 3-fold quantity of chlorine. The distilled solution is treated with 15 parts of calcined sodium carbonate and heated to 40° C. for 4 hours. After filtering off the sodium carbonate the chlorinated caoutchouc is precipitated from its solution with methanol. The chlorinated caoutchouc thus obtained has the same properties as that obtained in accordance with Examples 7 and 8.

*Example 10.*—100 parts of crepe are soaked in 1200 parts of benzene and slowly treated with 1 part of nitric acid (spec. grav. 1,45). This solution is then treated with the 3-fold quantity of chlorine and after chlorination freed from the free hydrochloric acid by distillation as much as possible. After adding 18 parts of calcined sodium carbonate the solution is heated to 60° C., while stirring, for 10 hours. Without further filtration the solvent is driven off of this solution by means of steam. The chlorinated caoutchouc thus isolated is distinguished by an excellent stability.

*Example 11.*—50 parts of chlorinated caoutchouc dissolved in 640 parts of carbon tetrachloride are stirred with 5 parts of finely powdered potassium carbonate at 60° C. for 5 hours. A stable chlorinated caoutchouc possessing good viscosity properties is thus obtained.

*Example 12.*—6 per cent. of magnesium carbonate (calculated upon chlorinated caoutchouc) are added to a 15% solution of chlorinated caoutchouc in chloroform. The solution is heated to 60° C. for 15 hours. The chlorinated caoutchouc thus obtained is sufficiently stable without showing an increase of viscosity.

*Example 13.*—300 parts of chlorine are introduced into a solution of 100 parts of caoutchouc in 2400 parts of carbon tetrachloride at room temperature. After the chlorination is complete the solution is heated to boiling for 12 hours while simultaneously distilling off 700 parts of carbontetrachloride. The solution thus obtained, being free from chlorine and almost free from acid is then treated with 25 parts of sodium carbonate and heated to boiling for 8–10 hours, while stirring. The reaction mixture is cooled without further stirring to room temperature, siphoned off from the salt mixture deposited at the bottom of the vessel and freed from the solvent, for instance, on drying rollers while heating at ordinary or reduced pressure.

*Example 14.*—The chlorinated and by heating with sodium carbonate stabilized solution obtained in accordance with Example 13, is evaporated to dryness in a Venuleth apparatus. The residue containing salt is finely ground and extracted with water of 60° C. until no more salt or sodium carbonate is dissolved. The residue being free from salt is dried at 80° C.

This is a continuation in part of our copending application for Letters Patent Serial No. 600,373, filed March 21, 1932.

We claim:—

1. The process of stabilizing halogenated caoutchouc which comprises removing the loosely bound halogen including a part of the same which has entered the caoutchouc molecule in the halogenation reaction by treating with a basic reacting substance at a temperature not exceeding about 150° C., a solution of the halogenated caoutchouc in a solvent which is resistant to the basic reacting substance.

2. The process of stabilizing chlorinated caoutchouc which comprises removing the loosely bound chlorine including a part of the same which has entered the caoutchouc molecule in the chlorination reaction by treating with a basic reacting substance at a temperature not exceeding about 150° C., a solution of the chlorinated caoutchouc in a solvent which is resistant to the basic reacting substance.

3. The process of stabilizing chlorinated caoutchouc which comprises removing the loosely bound chlorine including a part of the same which has entered the caoutchouc molecule in the chlorination reaction by treating with an inorganic basic reacting substance at a temperature not exceeding about 150° C., a solution of the chlorinated caoutchouc in a solvent which is resistant to the basic reacting substance.

4. The process of stabilizing chlorinated caoutchouc which comprises removing the loosely bound chlorine including a part of the same which has entered the caoutchouc molecule in the chlorination reaction by treating with an alkali metal hydroxide at a temperature not exceeding about 150° C., a solution of the chlorinated caoutchouc in a solvent which is resistant to the alkali metal hydroxide.

5. The process of stabilizing chlorinated caoutchouc which comprises removing the loosely bound chlorine including a part of the same which has entered the caoutchouc molecule in the chlorination reaction by treating with an alkali metal hydroxide at a temperature between about 0° and about 40° C., a solution of the chlorinated caoutchouc in a solvent which is resistant to the alkali metal hydroxide.

6. The process of stabilizing chlorinated caoutchouc which comprises removing the loosely bound chlorine including a part of the same which has entered the caoutchouc molecule in the chlorination reaction by treating with a basic reacting substance which is weaker than caustic alkali at a temperature between about 40° and about 150° C., a solution of the chlorinated caoutchouc in a solvent which is resistant to the basic reacting substance.

7. The process of stabilizing chlorinated caoutchouc which comprises removing the loosely bound chlorine including a part of the same which has entered the caoutchouc molecule in the chlorination reaction by treating with sodium carbonate at a temperature between about 40° and about 150° C., a solution of the chlorinated caoutchouc in a solvent which is resistant to said sodium carbonate.

8. The process of stabilizing chlorinated caoutchouc which comprises removing the loosely bound chlorine including a part of the same which has entered the caoutchouc molecule in the chlorination reaction by treating with a basic reacting substance which is weaker than caustic alkali, a solution of the chlorinated caoutchouc in carbon tetrachloride at a temperature between about 40° and about 150° C.

9. The process of stabilizing chlorinated caoutchouc which comprises removing the loosely bound chlorine including a part of the same which has entered the caoutchouc molecule in the chlorination reaction by treating with sodium carbonate, a solution of the chlorinated caoutchouc in carbon tetrachloride at a temperature between about 40° and about 150° C.

10. The process of stabilizing chlorinated caoutchouc which comprises removing the loosely bound chlorine including a part of the same which has entered the caoutchouc molecule in the chlorination reaction by boiling with sodium carbonate a solution of the chlorinated caoutchouc in carbon tetrachloride.

11. The process of stabilizing halogenated caoutchouc which comprises removing the loosely bound halogen including a part of the same which has entered the caoutchouc molecule in the halogenation reaction by treating for at least one hour with a basic reacting substance at a temperature not exceeding about 150° C., a solution of the halogenated caoutchouc in a solvent which is resistant to the basic reacting substance.

12. Halogenated caoutchouc derivatives which are stable at temperatures up to about 180° C. and are obtainable by the process defined in claim 1.

GERHARD BALLE.
FRANZ GROM.